(12) United States Patent
Wang

(10) Patent No.: US 6,712,106 B1
(45) Date of Patent: Mar. 30, 2004

(54) DUST BAG FOR WOOD WORKING MACHINE

(76) Inventor: Chin-Feng Wang, 11F-2, No.43, Chai-I Street, Taichung City (TW)

( * ) Notice: Subject to any disclaimer, the term of this patent is extended or adjusted under 35 U.S.C. 154(b) by 0 days.

(21) Appl. No.: 10/252,997

(22) Filed: Sep. 24, 2002

(51) Int. Cl.$^7$ .............................. B27G 19/00; B27C 2/00
(52) U.S. Cl. ...................... 144/252.1; 15/314; 409/137
(58) Field of Search .......................... 15/314, 323, 345, 15/352; 83/100; 144/252.1, 252.2; 409/131, 137; 241/92, 100, 301

(56) References Cited

U.S. PATENT DOCUMENTS

| | | | |
|---|---|---|---|
| 1,954,465 A | * | 4/1934 | Watson ........................ 409/137 |
| 2,604,129 A | * | 7/1952 | Johnson |
| 5,349,752 A | * | 9/1994 | Stirm .................. 144/252.1 X |
| 6,289,956 B1 | * | 9/2001 | Shriver ..................... 144/252.1 |
| 6,293,321 B1 | * | 9/2001 | Chiang ..................... 144/252.1 |
| 6,299,393 B1 | * | 10/2001 | Anders ................... 409/137 X |
| 6,382,278 B1 | * | 5/2002 | Liao et al. ................ 144/252.1 |

* cited by examiner

Primary Examiner—W. Donald Bray
(74) Attorney, Agent, or Firm—Charles E. Baxley

(57) ABSTRACT

A dust bag for wood working machine includes a first open end with which a mounting piece is engaged so as to be mounted to a blow outlet of the wood working machine, and a second open end which is cooperated with a securing device such that the second open end is secured to a bucket. The dust bag is made of air-permeable material and the wood shreds are blown into the dust bag.

12 Claims, 7 Drawing Sheets

DUST BAG FOR WOOD WORKING MACHINE

FIELD OF THE INVENTION

The present invention relates to a dust bag having a securing device on one open end for being secured to an opening of a bucket or garbage bag, and a mounting piece on the other open end of the dust bag so as to be mounted on the blow outlet of the wood working machine.

BACKGROUND OF THE INVENTION

A conventional wood working machine has a blade which is power by a motor so as to cut or plain a wood piece and the wood shreds are blown away from the machine. The wood shreds spread around the machine and make the working site to be mess and slippery. The wood powder is harmful to the user's lung and requires a lot of labor to clean up the working site.

The present invention intends to provide a dust bag for a wood working machine and the dust bag has two open ends one of which is securely mounted to the blow outlet of the machine and the other open end is cooperated with a securing device so as to fastened on a bucket. The dust bag is made of air-permeable material which is advantageous for the air flow and guide the wood shreds into the dust bag.

SUMMARY OF THE INVENTION

In accordance with one aspect of the present invention, there is provided a dust bag for wood working machine and the dust bag comprises a first open end and a second open end. A mounting piece is engaged with an inside of the first open end of the dust bag so as to be mounted to a blow outlet of the wood working machine. A securing device is connected to the second open end and secures the second open end of the dust bag to a bucket.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
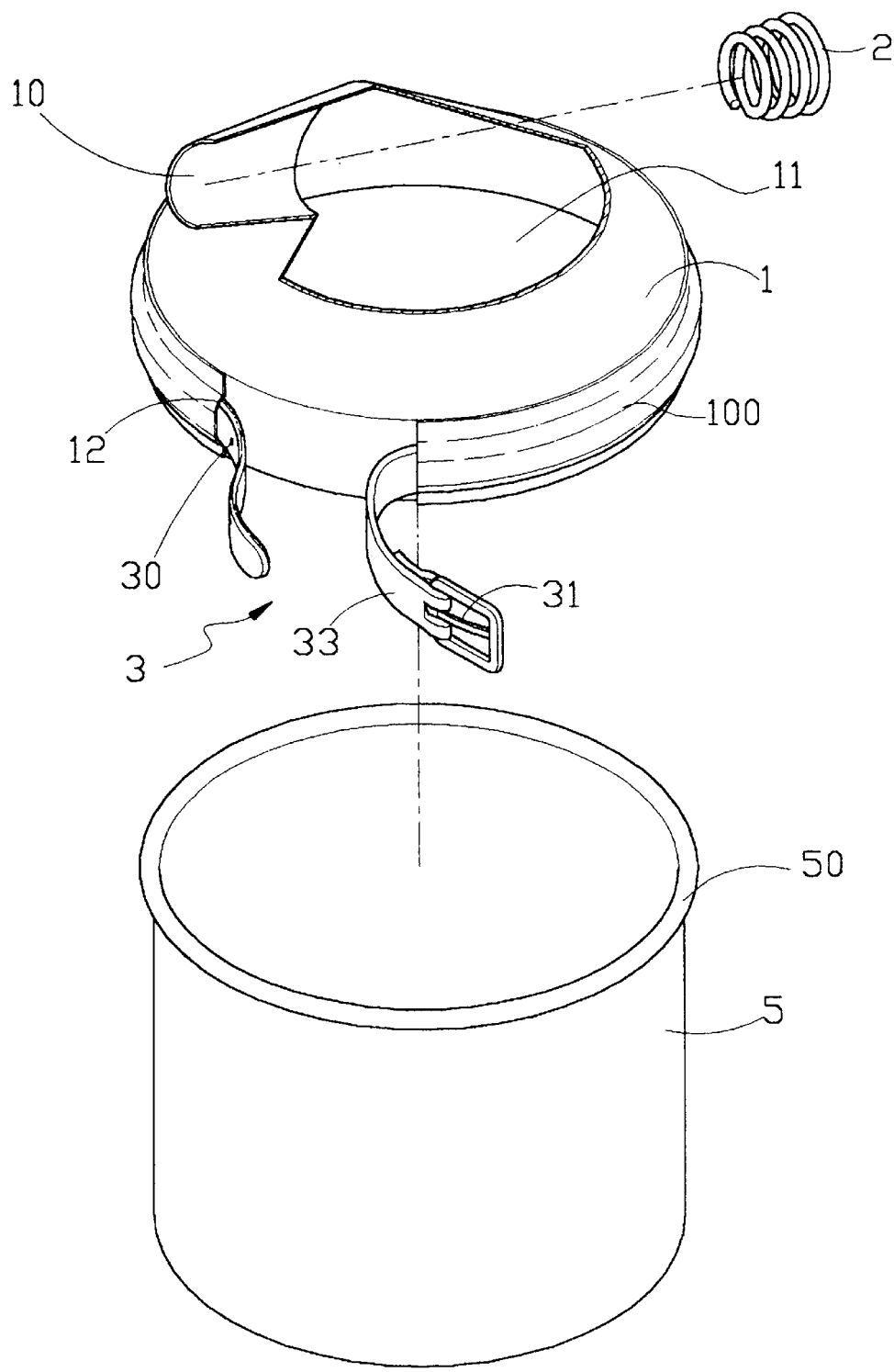
FIG. 1 is an exploded view to show the dust bag of the present invention and a bucket.
Figure 2:
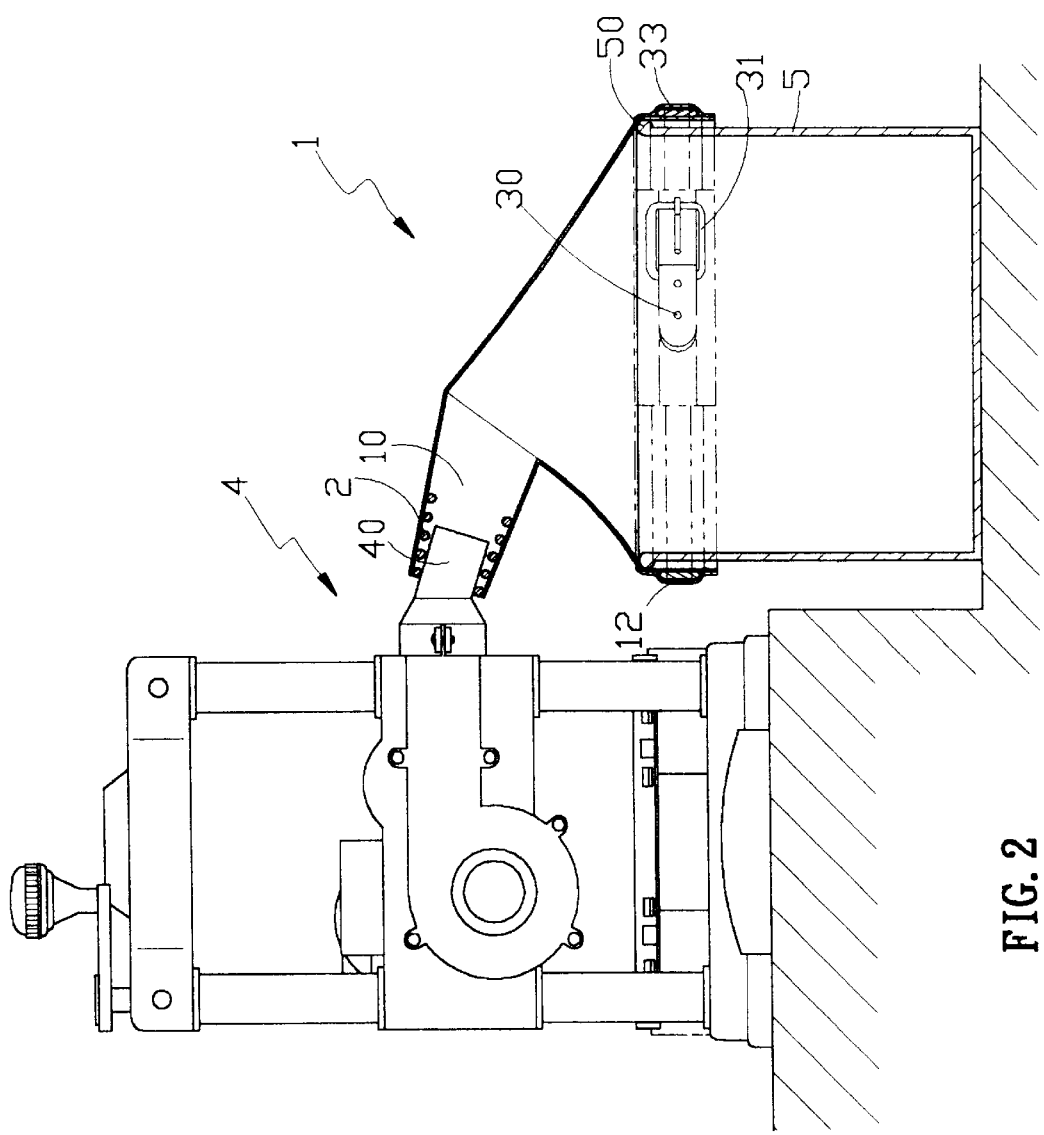
FIG. 2 shows the dust bag of the present invention is connected between the wood working machine and the bucket.
Figure 6:
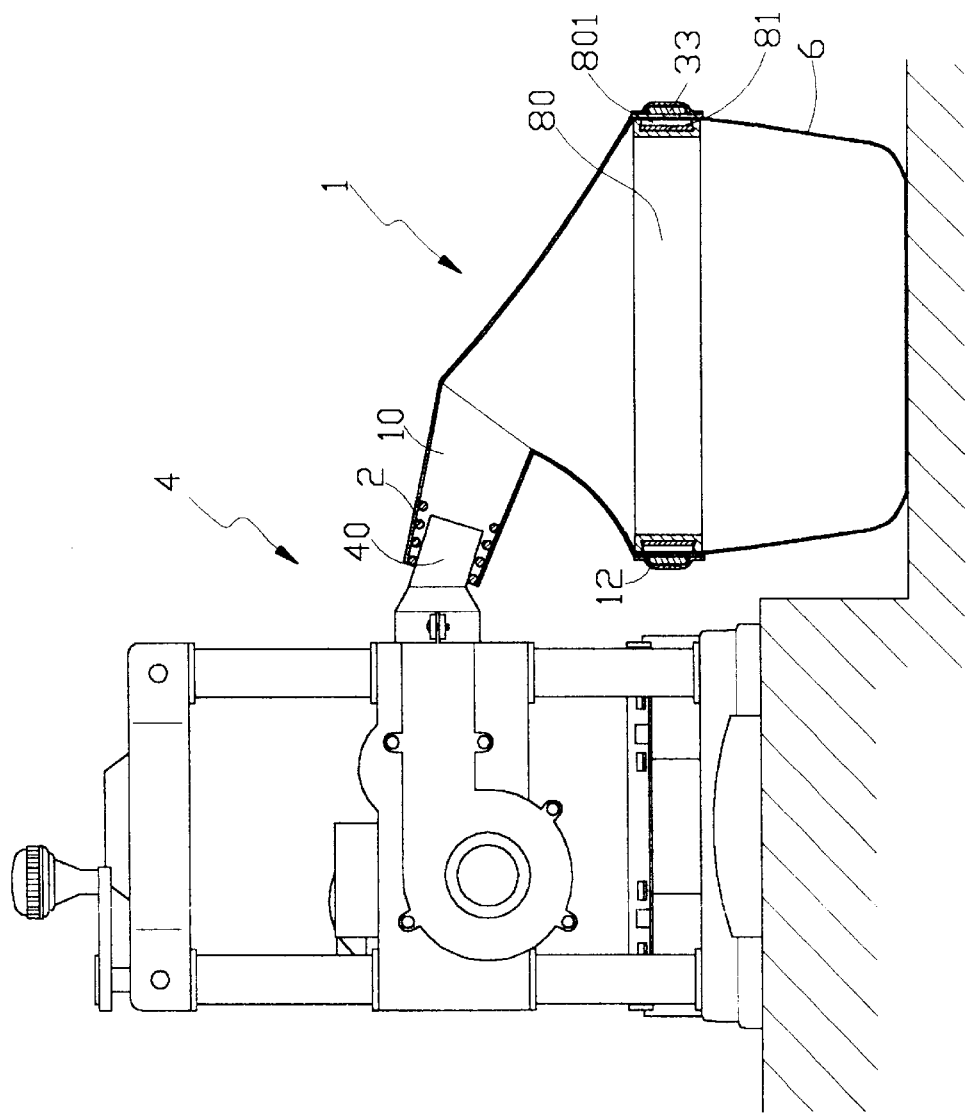
FIG. 6 shows the dust bag with the rails and connection plates is connected between the wood working machine and the bucket.

Referring to FIGS. 1 and 2, the dust bag 1 for wood working machine of the present invention is made of air permeable material and comprises a first open end 10 and a second open end 11. A expandable cone-shaped mounting piece 2 which can be a cone-shaped spring is engaged with an inside of the first open end 10 of the dust bag 1 and mounted to a blow outlet 40 of the wood working machine 4. A securing device 3 is connected to the second open end 11 and can be mounted to a bucket 5 or a bag as shown in FIG. 6.

A C-shaped strip 100 is connected to an outside of the second open end 11 of the dust bag 1 and a fastening member 33 such as a belt extends through a passage 12 defined between the outside of the dust bag 1 and the C-shaped strip 100. Two ends of the fastening member 33 extends from two open ends 12 of the passage 12. A buckle set 31 is connected on one of the two ends of the fastening member 33 and holes 30 are punched through the other end of the fastening member 33. The buckle set 31 is engaged with one of the holes 30 to secure the second open end of the dust cap 1 to a flange 50 on a top open end of the bucket 5. The expandable cone-shaped mounting piece 2 makes sure that the first open end of the dust bag 1 is secured to the blow outlet 40 having different sizes.

Figure 3:
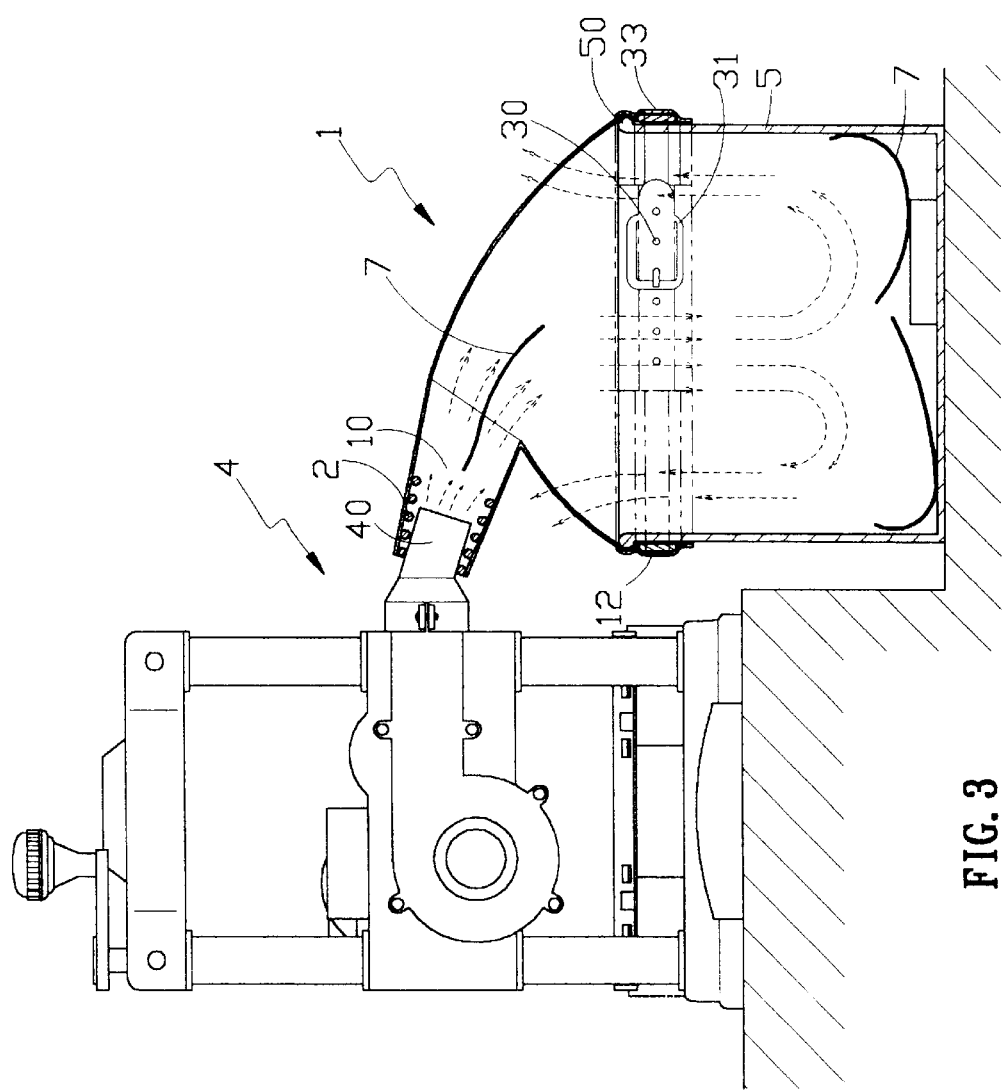
FIG. 3 shows the wood shreds are blown into the dust bag of the present invention.

Referring to FIG. 3, because the dust bag 1 is made of air permeable material so that the air can go through the dust bag 1 and the wood shreds 7 can be blown into the dust bag.

Figure 4:
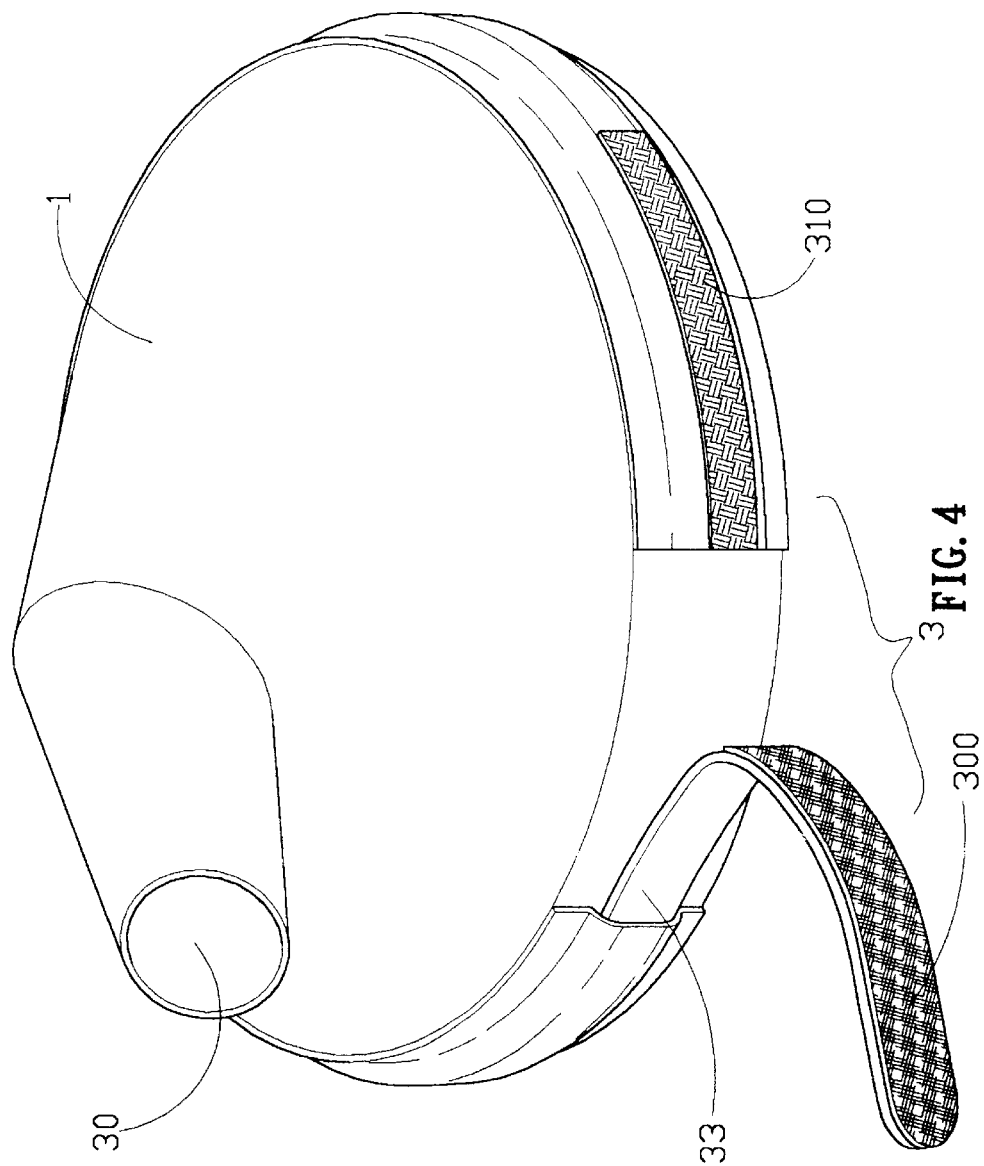
FIG. 4 shows another embodiment of the securing device of the dust bag.

Referring to FIG. 4, one of the two ends of the fastening member 33 can also have a plurality of loops 310 located thereon and a plurality of hooks 300 are located on the other end of the fastening member 33. The hooks 300 are engaged with the loops 310.

Figure 5:
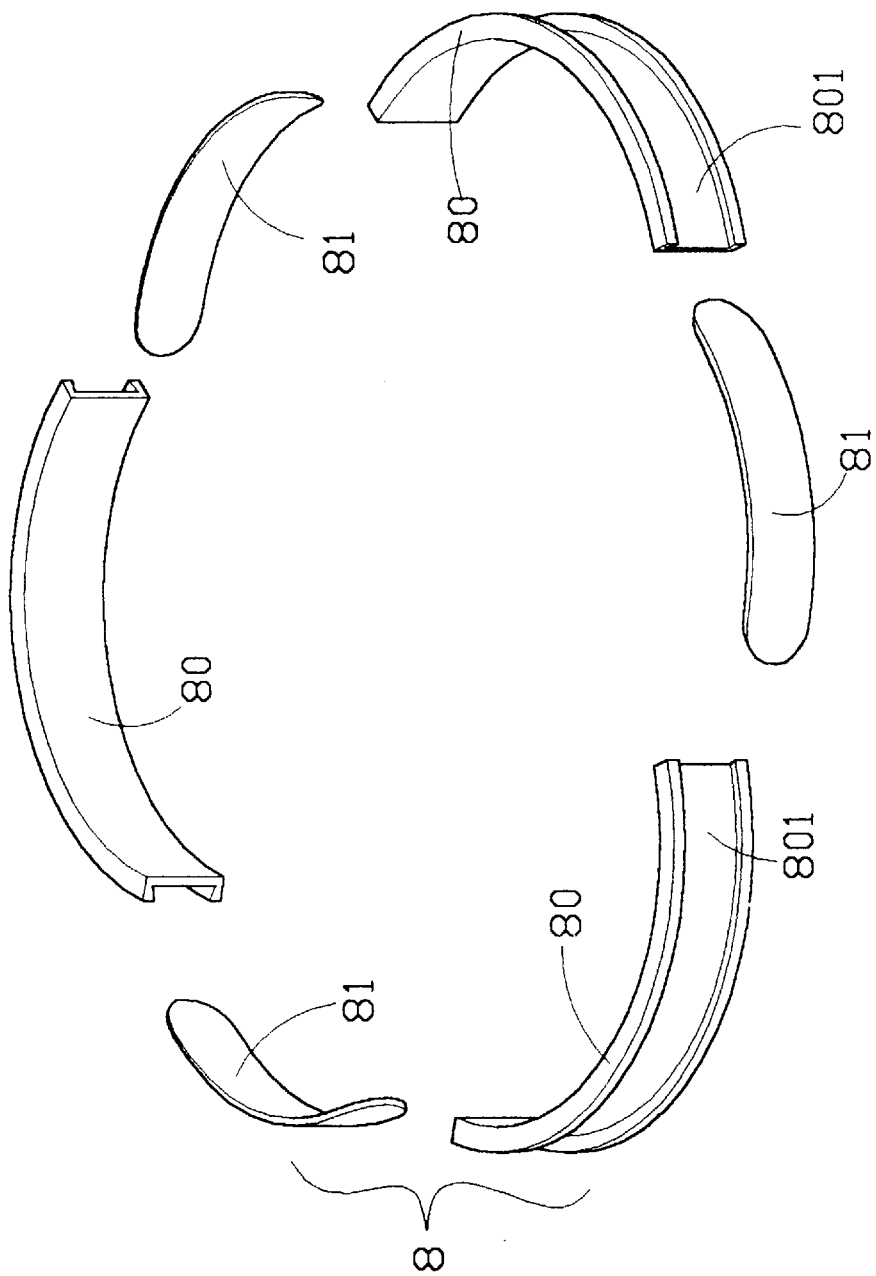
FIG. 5 shows rails and connection plates connected to the second open end of the dust bag.
Figure 7:
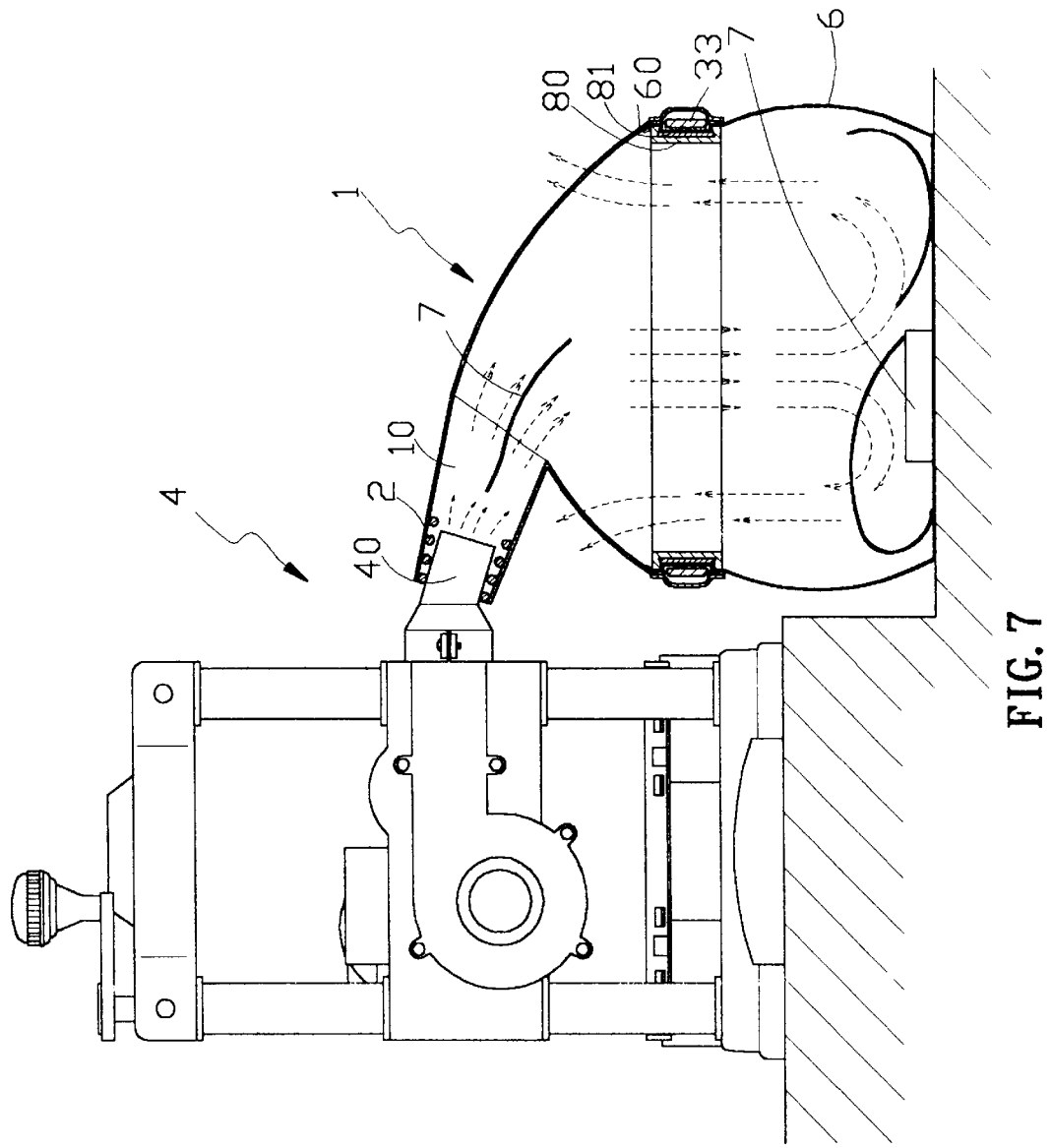
FIG. 7 shows the wood shreds are blown into the dust bag of the present invention as shown in FIG. 6.

Referring to FIGS. 5 to 7, the second open end of the dust bag 1 may be cooperated with a plurality of rails 80 which are connected in separated to an inside of the second open end 11 of the dust bag 1 and each of the rails 80 has a groove 801 defined in a side thereof and a plurality of the connection plates 81 are movably engaged with the grooves 801. The engagement of the rails 80 and the connection plates 81 can be any known shapes such as dove-tailed recess.

While we have shown and described the embodiment in accordance with the present invention, it should be clear to those skilled in the art that further embodiments may be made without departing from the scope of the present invention.

What is claimed is:

1. A dust bag for wood working machine, the dust bag comprising a first open end and a second open end;
    an expandable cone-shaped mounting piece engaged with an inside of the first open end of the dust bag and adapted to be mounted to a blow outlet of the wood working machine, and
    a securing device connected to the second open end and adapted to be mounted to a bucket.

2. The dust bag as claimed in claim 1 further comprising a C-shaped strip connected to an outside of the second open end of the dust bag and a fastening member extending through a passage defined between the outside of the dust bag and the C-shaped strip, two ends of the fastening member extending from two open ends of the passage, the two ends of the fastening member being engaged with each other.

3. The dust bag as claimed in claim 2 further comprising a buckle set on one of the two ends of the fastening member and holes being punched through the other end of the fastening member.

4. The dust bag as claimed in claim 2 further comprising a plurality of loops located on one of the two ends of the fastening member and a plurality of hooks located on the other end of the fastening member, the hooks engaged with the loops.

5. The dust bag as claimed in claim 2 further comprising a plurality of rails connected in separated to an inside of the second open end of the dust bag and a plurality of connection plates movably engaged between the rails.

6. The dust bag as claimed in claim 5, wherein each of the rails has a groove defined in a side thereof and the connection plates are movably engaged with the grooves.

7. A dust bag for wood working machine, the dust bag comprising a first open end and a second open end;
- a mounting piece engaged with an inside of the first open end of the dust bag and adapted to be mounted to a blow outlet of the wood working machine;
- a securing device comprising a C-shaped strip connected to an outside of the second open end of the dust bag and a fastening member extending through a passage defined between the outside of the dust bag and the C-shaped strip, two ends of the fastening member extending from two open ends of the passage, the two ends of the fastening member being engaged with each other so as to be adapted to mount the dust bag to a bucket.

8. The dust bag as claimed in claim 7, wherein the mounting piece is an expandable cone-shaped member.

9. The dust bag as claimed in claim 7 further comprising a buckle set on one of the two ends of the fastening member and holes being punched through the other end of the fastening member.

10. The dust bag as claimed in claim 7 further comprising a plurality of loops located on one of the two ends of the fastening member and a plurality of hooks located on the other end of the fastening member, the hooks engaged with the loops.

11. The dust bag as claimed in claim 7 further comprising a plurality of rails connected in separated to an inside of the second open end of the dust bag and a plurality of connection plates movably engaged between the rails.

12. The dust bag as claimed in claim 11, wherein each of the rails has a groove defined in a side thereof and the connection plates are movably engaged with the grooves.

* * * * *